United States Patent [19]

Rennau

[11] Patent Number: 5,652,488

[45] Date of Patent: Jul. 29, 1997

[54] WELDING ELECTRODE HOLDER CONTROL

[76] Inventor: Wolfram Rennau, Sperberweg 57, D-52076 Aacehn, Germany

[21] Appl. No.: 513,793

[22] PCT Filed: Feb. 23, 1994

[86] PCT No.: PCT/DE94/00210

§ 371 Date: Nov. 13, 1995

§ 102(e) Date: Nov. 13, 1995

[87] PCT Pub. No.: WO94/20254

PCT Pub. Date: Sep. 15, 1994

[30] Foreign Application Priority Data

Mar. 3, 1993 [DE] Germany ............... 43 06 492.2

[51] Int. Cl.$^6$ ............................................. B25J 9/10
[52] U.S. Cl. ............... 318/568.16; 318/645; 219/86.51
[58] Field of Search .................... 318/567, 568.1, 318/568.11, 568.16, 568.17, 645, 652; 219/56.1, 56, 56.22, 57, 61.13, 61.4, 61.5, 78.01, 85.22, 86.1, 86.33, 86.41, 86.51; 364/474.02, 474.12, 474.22, 474.37

[56] References Cited

U.S. PATENT DOCUMENTS

| | | | |
|---|---|---|---|
| 3,848,170 | 11/1974 | Morales | 318/487 |
| 4,039,779 | 8/1977 | Rupert | 318/640 X |
| 4,562,391 | 12/1985 | Inoue | 318/568 |
| 4,564,912 | 1/1986 | Schwefel | 219/69 G |
| 4,912,294 | 3/1990 | Tsujii | 219/86.24 |
| 5,111,020 | 5/1992 | Stiebel | 219/110 |
| 5,287,049 | 2/1994 | Olomski et al. | 364/474.22 |
| 5,360,958 | 11/1994 | Bogue et al. | 219/86.51 |

FOREIGN PATENT DOCUMENTS

| | | |
|---|---|---|
| 3500806 | 7/1986 | Germany . |
| 3612502 | 12/1988 | Germany . |
| 2261081 | 5/1993 | United Kingdom . |

OTHER PUBLICATIONS

Lehmkuhl et al., "Fortschwitte in der Processdotenerfassung bein Widerstordspress schweissen", Schweissen und Schneider 42 (1990), Heft 1, Seiten 26–29.

Primary Examiner—Jonathan Wysocki
Attorney, Agent, or Firm—Felfe & Lynch

[57] ABSTRACT

A robot welding device with a servo-valve controlled drive for the electrodes and an electrical control for the servo-valves with at least one transducer for actual data on the welding process and an interface for the measurements to a computer unit. By way of a holder program running on the computer, it is possible to freely select the set data assigned to the individual work phases. The comparison between the set values of the holder program and the actual data measurement sensors makes it possible, in conjunction with the interface for the servo valves, to complete the preselected work phases with precision.

19 Claims, 5 Drawing Sheets

WELDING ELECTRODE HOLDER CONTROL

BACKGROUND OF THE INVENTION

The invention pertains to a system of components for the automatic control of an electrode holder, referred to in abbreviated form below as an automatic control system, which is especially suitable for use on a welding robot, and which includes a servo valve-controlled drive for the welding electrodes and an electronic control system for the servo valves.

Electrode holders of this type are used especially in automated resistance welding operations, where they serve primarily to join pieces of sheet metal. When spot welding is to be carried out, the surfaces resting on each other are usually welded with pin-shaped electrodes; when continuous seams are to be produced, electrode wheels are used.

The electrode holders according to the state of the art have welding electrodes which can be driven pneumatically between their extreme positions. The electrode pressure can be adjusted by means of a pressure-actuated servo valve acting on the air cylinder. The pressure-actuated servo valve reduces the external supply pressure present in the main compressed-air supply line to the desired variable final pressure. So that the air cylinder can drive the electrodes into their extreme positions, one of the two sides of the cylinder is completely evacuated, while the opposite side is completely filled. After the air cylinder has been driven into the extreme closed position, the welding process is initiated after a preliminary contact time, the duration of which can be programmed in advance. The preliminary contact time allows the pres- sure to be built up. It is assumed that, by the end of this time, a minimum required percentage of the final welding pressure has been reached. This time is always made as short as possible, because it prolongs the overall time required to produce a spot weld. If, however, the welding occurs before the minimum required final pressure is reached, that is, if the spot is welded too soon, melted material is ejected at high speed from the workpiece being welded (so-called spatter formation), which negatively affects the quality of the spot weld and possibly the surface of the workpiece.

The known automatic control system for electrode holders, furthermore, suffers from the disadvantage that it generates a significant amount of noise when the electrodes make contact. The high speed at which the electrodes make contact also leads to a considerable amount of wear on the electrodes and to significant stress on the mechanical parts of the holder. The known control systems for electrode holders, furthermore, consume a large amount of compressed air, which is extremely disadvantageous when the compressed air supply system is underpowered and also results in the consumption of a great deal of energy.

To eliminate these problems, the attempt has been made to use water-cooled electric motors as drives for the welding electrodes, but this approach has not been successful because of the heat problems from which the electric drives suffer in conjunction with the high pressures used and because of the cost of the electronic control systems.

In addition, programmable, open-loop control systems have also been developed, but primarily with the goal of simplifying the control activities.

German Offenlegungsschrift No. 3500806 describes a programmable, open- loop control system for an industrial welding robot, especially a resistance welding machine with an integrated open-loop control system. The welding parameters themselves are stored in the program memory of the actual robot control system. These parameters can be called up at the proper time and can be converted by a stored-program control system into firing commands for the welding current regulator. This control system is intended primarily to simplify the control of the resistance welding current.

The standard process variables of resistance welding, specifically the force, acceleration, and path of the electrodes, the welding current, and the electrode voltage as well as the measurement sensors suitable for tracking them are described in Lehmkuhl, B., H. Preβ, M. Römer, and G. Weber: "Fortschritte in der Prozoβdatenerfassung und Prozeβdatenverarbeitung beim Widerstandspreβschweiβen" [Advances in Process Data Measurement and Process Data Processing in Resistance Welding], Schweiβen und Schneiden, Vol. 42, No. 1, pp. 26–29, 1990.

In addition, German Offenlegungsschrift No. 2915442 describes a process for bringing the electrode of a resistance welding machine into contact with the workpiece, according to which contact is achieved essentially without pressure and the electrode force is built up reliably without any kinematic falsification. To achieve these goals, movements of the electrodes are brought about by the successive actuation of two different pistons connected in series.

Finally, German Patent No. 3612502 describes a pneumatically actuated welding cylinder suitable for driving robot spot welding machines. This cylinder is especially designed to make possible an approach stroke and a working stroke.

SUMMARY OF THE INVENTION

The invention proceeds from the state of the art described above and is based on the task of creating an automatic control system for an electrode holder which significantly reduces the noise produced when the welding electrodes make contact, which guarantees the welding electrodes a longer service life, and which reduces the stress on the mechanical parts of the holder and decreases the overall welding time.

The automatic control system according to the invention makes it possible to reduce the consumption of compressed air and also to eliminate the formation of spatters.

The solution is based on the idea of dividing the welding cycle into various work phases, to which specific set data are assigned.

In detail, the task is accomplished in that an automatic control system for an electrode holder of the general type indicated above has:

at least one measurement sensor for actual data e.g. position and pressure) of the welding process and an interface for sending the measurement values to a computer;

at least two servo valves for the drive;

a holder program running on the computer, by means of which the set data of the welding process can be freely selected in advance; and an interface to transmit signals from the computer to the servo valves.

By means of the holder program running on the computer, it is possible to freely select the set data assigned to the individual work phases. The comparison between the set values of the holder program and the actual data from the measurement sensors makes it possible, in conjunction with the interface for the servo valves, to complete the preselected work phases with precision. As a result, the electrodes no longer make contact at high speed. This avoids the generation of high forces, and therefore the amount of noise produced is considerably reduced, and the wear on the electrodes is decreased.

In an advantageous embodiment of the invention, the movement of the drive which actuates the welding electrodes is divided into the following, freely selectable and/or optimizable phases:

the approach stroke-opening/closing, which refers to the motion of the welding electrodes toward the workpiece to be welded from the fully open position "APPROACH_TO", this stroke ending a short distance in front of the workpiece (in the position "APPROACH_AT");

the working stroke-opening/closing, which refers to the motion WORK_TO of the welding electrodes from the position APPROACH_AT to the workpiece, but without actually touching it (WORK_AT). The programming of a working stroke such as this has the effect of preventing the welding electrodes from hitting the workpiece to be welded. The movement of the working stroke is divided into the closing stroke before the welding process and the opening stroke after the welding process;

pressure build-up and welding, where an electrode force proportional to the drive pressure is reached. This working phase is designed in such a way that the electrodes, which have already been positioned right at the workpiece, no longer need to pass through an acceleration phase while the pressure is being built up, which means that electrode wear is minimized.

It is not necessary to preselect all of the set data required for the working phases described above for each welding process; on the contrary, it is usually sufficient to enter the respective approach stroke and working stroke positions. The other set data or control parameters can be optimized for each individual phase.

According to the state of the art, the average pressure during positioning controls is usually about 50% of the supply pressure available from the compressed air system. It can be varied within certain limits by adjustment of the zero point of the servo valves of the drive.

The consumption of compressed air and the total welding time for a welding cycle can be considerably reduced by allowing the holder program actively to adjust the positioning pressure at all times. During the working stroke, the program can keep the pressure close to the required welding pressure; and during prolonged movements of the holders, it can reduce the pressure to a lower level.

The only remaining way in which the overall welding time, that is, the sum of the individual times for the approach stroke, the working stroke, and the pressure build-up phase, can be further decreased is by reducing the time allowed for the pressure to be built up, because, once a certain minimum distance is exceeded, the times for the approach and working strokes are directly proportional to the distances to be traveled. The pressure build-up time, however, depends on the pressure difference between the positioning pressure and the welding pressure required for the welding operation.

Because the holder program integrated into the automatic control system is able to bring the positioning pressure into the range of the required welding pressure, the pressure build-up time can be decreased to almost any desired value. This is possible, because, at the time of the transition from the working stroke to the pressure build-up and welding phase, the actual pressure in the forward chamber of the cylinder (in terms of its direction of movement) is negligible because of its very small volume.

The automatic control system according to the invention allows another reduction in the welding time to be made by making it possible to minimize the length of time required for a specific welding process through the appropriate selection of suitable positions for, for example, the WORK_TO and WORK_AT strokes.

In an advantageous embodiment of the invention, the actual data of the welding process required for the operation of the automatic control system are obtained from measurement sensors which detect the position of the drive and the pressure of the holder. The position of the drive is preferably determined in the form of absolute analog values by a resistance sensor and sent to the computer of the automatic control system by way of an analog-digital (AD) converter. Through the use of a so-called "electronic magnifier", the resolution with which the position of the drive is detected can be considerably increased for certain selected phases of its movement. Thus, resolutions in the range of approximately one-hundredth of a millimeter can be achieved, which makes it possible to position the drive with extreme precision and also to measure the welding pressure by way of the deformation of the electrode holder bracket. It is also possible, for example, to measure with great precision the thickness of the metal sheet before and during welding and to measure the amount of electrode wear.

With the help of the holder program, the measurement of the pressure makes it possible to calculate the precise moment at which welding should begin. This means that the spattering which occurs when welding is begun too soon, as often happens in the process according to the state of the art, is almost completely eliminated.

Another reduction in the cycle time for welding operations can be achieved by means of an adaptive software control system with rate feedback in effect during the approach and/or working stroke.

In an advantageous embodiment of the invention, the pressure can be changed during the welding process. As a result, it thus becomes possible, for example, to weld aluminum sheets under continuously decreasing pressure to counter the tendency of aluminum to soften as it is heated.

In a further elaboration of the invention, the automatic control system has a cut-in damper acting on the drive of the welding electrodes, this damper being preferably in the form of a double-acting pneumatic cylinder. A cut-in damper of this type improves the behavior of the automatic control system when it is first turned on. The problem which occurs when systems of this type are turned on, especially systems with a pneumatic, double-acting cylinder, consists in that the pressure in the cylinders is only ambient pressure at first. If the piston is located near one of its extreme positions, the smaller volume of the double-acting cylinder fills with air more quickly than the other side. As a result, the piston and the connecting rod execute powerful, uncontrolled movements until the necessary positioning pressure has been reached on both sides. A flow limiter on the servo valves damps the piston during the cut-in process. The servo valves can be damped either mechanically or electronically, in that the electric drive signal is limited, either by means of the program running on the computer or by some other means, to a value smaller than the maximum value for the electric drive signal of the servo valves. Damping is continued only until the automatic control system has stabilized. Then the full flow through the servo valves is restored.

The forces of acceleration and deceleration occurring during the rapid positioning of the cylinder lead, especially in the case of scissor-type holders, to mechanical vibrations of the entire holder in its suspension from the robot. To avoid these undesirable vibrations, it is proposed in a further elaboration of the invention that an extreme-position damper be provided on the drive of the welding electrodes, preferably a pneumatic, double-acting cylinder. With this extreme-position damping system, the flow through the servo valves is reduced, preferably always decreasing from the maximum flow rate, before the connecting rod has reached its extreme position. Both the point before the extreme position at which the flow is reduced and the extreme position itself can be freely selected by way of the holder program. The connecting rod can then be brought into its extreme position at a reduced flow rate through the servo valves. It is a straightforward matter to use the holder program to preselect various end positions and, independently thereof, to specify the associated curves which describe the decrease in the flow rate as a function of time.

Electrode holders are used in conjunction with resistance welding machine control systems. In most cases, these resistance welding control systems automatically count the number of welds. After an empirically determined number of welds, the welding current is automatically switched to a higher value to compensate for the increase in resistance which occurs during the welding process as a result of the wearing-down of the electrodes. In a further elaboration of the invention, a signal corresponding to the change in the welding current is sent to the computer as an actual datum; as a function of this electronic signal, the computer increases the electrode force, which is proportional to the drive pressure, as the wear of the electrodes progresses.

A separate welding timer becomes superfluous if the automatic electrode holder control system according to the invention also drives the final control elements for the welding current by way of the holder program. All of the information required for the welding process itself is stored in the holder program and transferred by way of digital or analog control lines to the separate final control element for the welding current.

If the computers of the control systems are linked in a network, multiple electrode holders with automatic control systems according to the invention can be programmed from a central point.

The programming work can be reduced by combining the unchanging set data of the welding process, especially the data pertaining to the motion of the welding electrodes during each of the individual phases, into a "base" program, which can be generated in the computer by calling it up when needed. Thus only the variable set data required in a specific case, such as the holder pressure and the extreme positions of the electrodes, need to be entered as set data.

Before welding, the necessary pressure must be built up at the welding electrodes; and as part of this process, an electrode force is reached which is proportional to the drive pressure. To achieve optimum welding results, it is of interest to know the electrode force. The conventional method for determining the electrode force is to make measurements by means of strain gauges or other force sensors. This force value is then used by the automatic control system as an actual datum of the welding process. Measuring the force this way, however, is cumbersome. During the development of the automatic control system according to the invention, it was discovered that the brackets of the electrode holders have a certain elasticity and therefore undergo a measurable amount of flexure as a result of the accumulation of force between the welding electrodes. This bending of the brackets results in a defined change in the position of the electrodes during the pressure and force build-up period. In accordance with the invention, the automatic electrode holder control system takes advantage of this effect to calculate the electrode force. First, the position of the drive is determined as a function of time, from which the flexure of the brackets of the electrode holder can be derived. Then it is possible for the computer to calculate the electrode force, since this is proportional to the amount of flexure. Although the deflection of the electrode brackets is not linear with respect to the actual electrode force applied, it is nevertheless proportional, calibratable, and therefore reproducible for each holder. It is therefore possible to determine the position of the welding electrode drive, which is recorded in any case as an actual datum, as a function of time from an appropriately recorded calibration curve and thus to arrive at the electrode force.

In a further elaboration of the invention, the automatic electrode holder control system is combined into a module, which is installed on or near the electrode holder.

Conventional electrode holders can easily be retrofitted with the automatic control system according to the invention.

The invention is explained in greater detail below on the basis of actual examples.

BRIEF DESCRIPTION OF THE DRAWINGS

Figure 1:
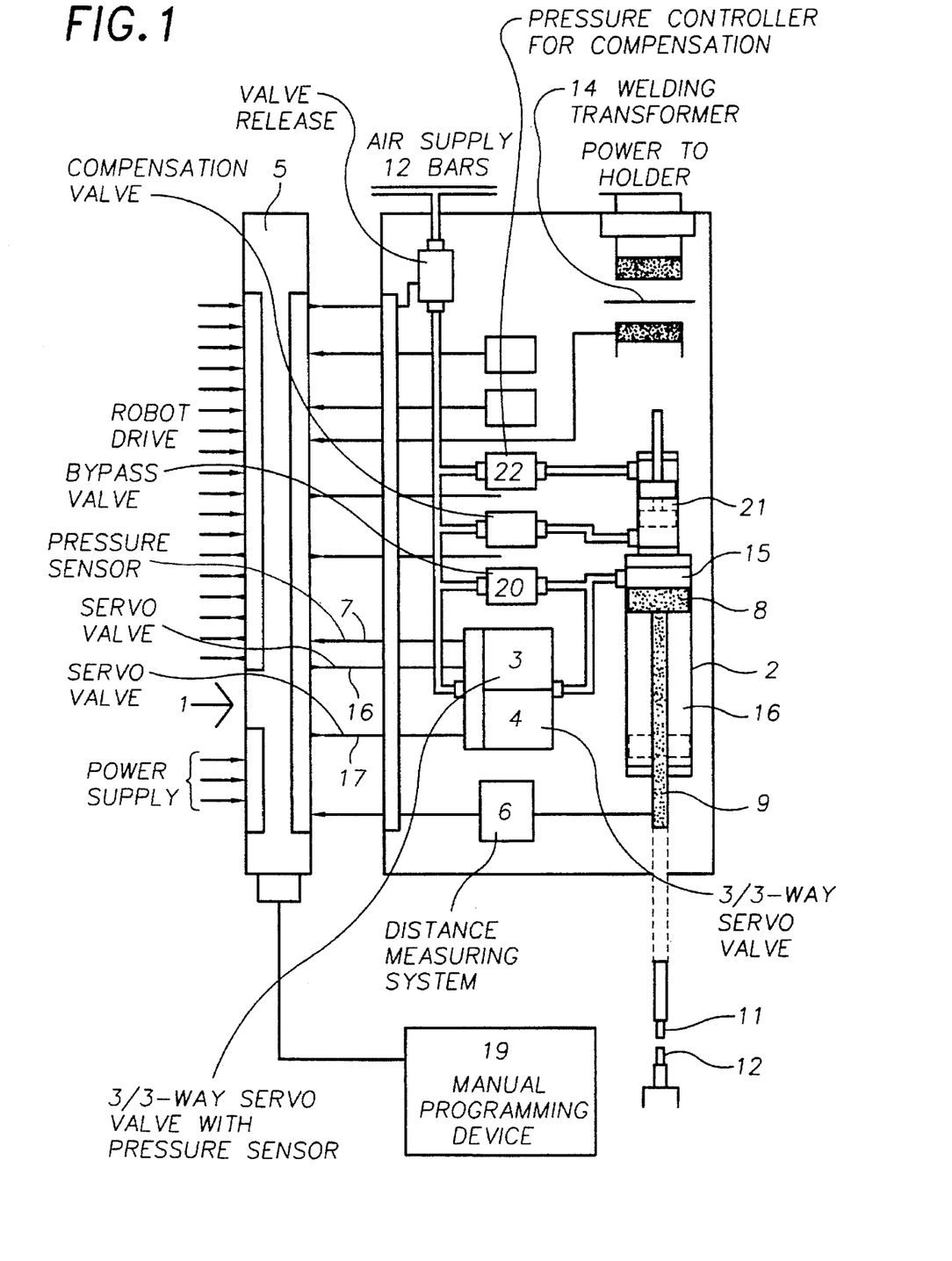
FIG. 1 shows a schematic block diagram of a automatic control system for an electrode holder according to the invention.

FIG. 1 shows an automatic control system, designated in its entirety as 1, for an electrode holder, especially for use on a welding robot, not shown in the drawing. The system includes a cylinder 2, serving as the drive unit; two servo valves 3, 4, which control cylinder 2; a computer 5; and measurement sensors 6, 7.

A piston 8 with a connecting rod 9 is guided in cylinder 2 and has at one end an electrode 11, which can be moved toward a counterelectrode 12.

Figure 2:
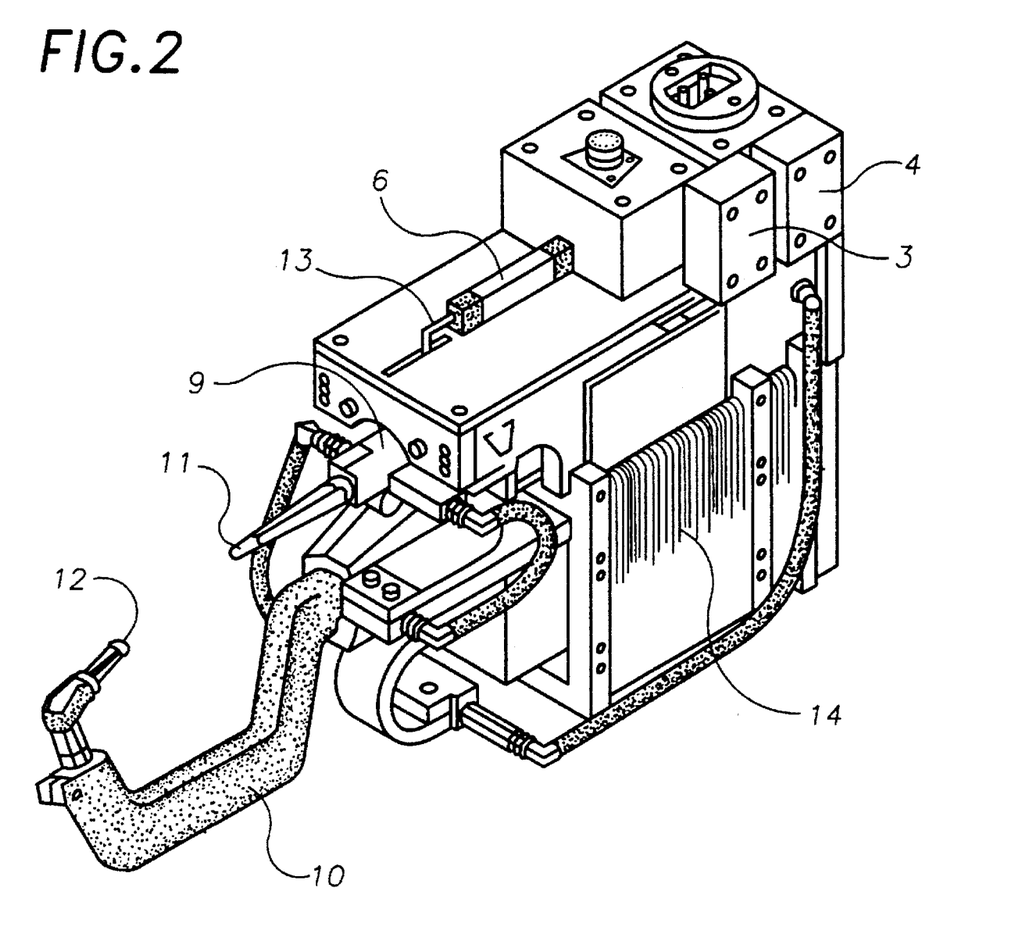
FIG. 2 shows a view, in perspective, of an electrode holder with an automatic control system according to the invention.

As can also be seen from FIG. 2, counterelectrode 12 is attached with a small degree of flexibility to a welding bracket 10, which, because of its essentially U-shaped form, can grip around the workpiece to be welded.

As can also be seen from FIG. 2, measurement sensor 6 for detecting the position of connecting rod 9 is attached to the housing of the electrode holder and is connected by way of a linkage of rods 13 to connecting rod 9 of cylinder 2.

FIG. 2 also shows a welding transformer 14, which provides the required welding current, and the arrangement of servo valves 3, 4 on the housing of the electrode holder.

The way in which the automatic control system according to the invention functions can best be explained on the basis of FIG. 1. Measurement sensor 6 detects the current position of connecting rod 9 of cylinder 2 and transmits a corresponding analog signal in the range of 0–10 volts to computer 5.

The current pressure in rear chamber 15 of cylinder 2 is detected at servo valve 3, and this value is also transmitted to computer 5. There the set values are compared with the actual ones on the basis of the set data for the welding process previously entered on a manual programming device 19. Signals 16, 17, which are sent from computer 5 to servo valves 3, 4, control the movement of cylinder 2 in a manner corresponding to the holder pro- gram running on computer 5.

With this arrangement, it is possible for the holder program to drive electrode 11 attached to the tip of connecting rod 9 in accordance with the freely programmable welding data.

By the use of the automatic control system, the holder closing distance can be reduced, the actual reduction depending on the application in question, and the pneumatic actuation of the cylinder can be optimally controlled, with the result that the holder closing time can be reduced to as little as 40 milliseconds.

Figures 3A, 3B, 3C:
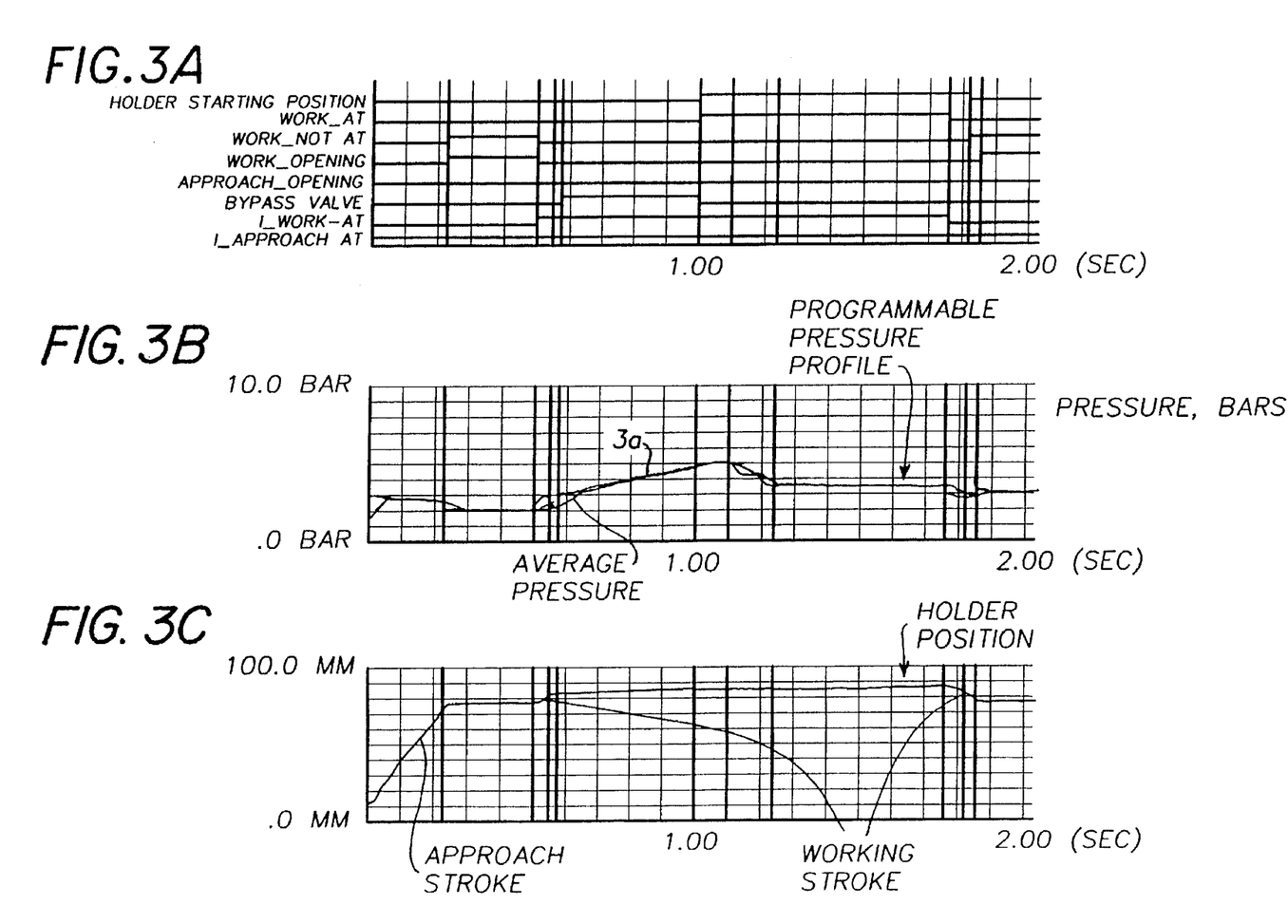
FIG. 3A shows a sequence of signals for controlling the servo valve-controlled drive during all phases of movement.
FIG. 3B shows pressure diagrams of the servo-controlled drive as a function of time.
FIG. 3C shows the position of the servo-controlled drive as a function of time.

The holder program divides the movement of piston 8 and of connecting rod 9 into the following phases, which can be freely preselected and/or optimized via the programming of the holder program (see the "position" diagram in FIG. 3C):

Phase 1: approach stroke-closing, which refers to the movement of welding electrode 11 toward counterelectrode 12;

Phase 2: working stroke-closing, which refers to the movement of welding electrode 11 up to, but not actually touching, the workpiece;

Phase 3a: pressure build-up, as can be derived from the "pressure" diagram (FIG. 3B).

By way of the holder program and the corresponding actuation of the servo valves 3, 4, the rate at which the pressure is built up and the amount of this pressure can be precisely adjusted.

After the pressure build-up phase and the following welding operation, the "working stroke-open" and "approach stroke-open" phases are carried out in reverse order.

Figure 4B:
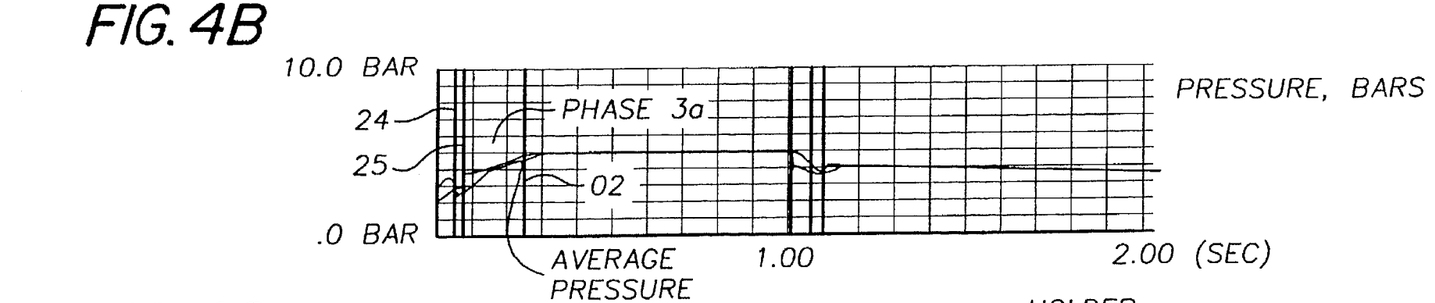
FIG. 4B shows pressure diagrams of the servo-controlled drive as a function of time (phase 2 to phase 3)
Figure 5:
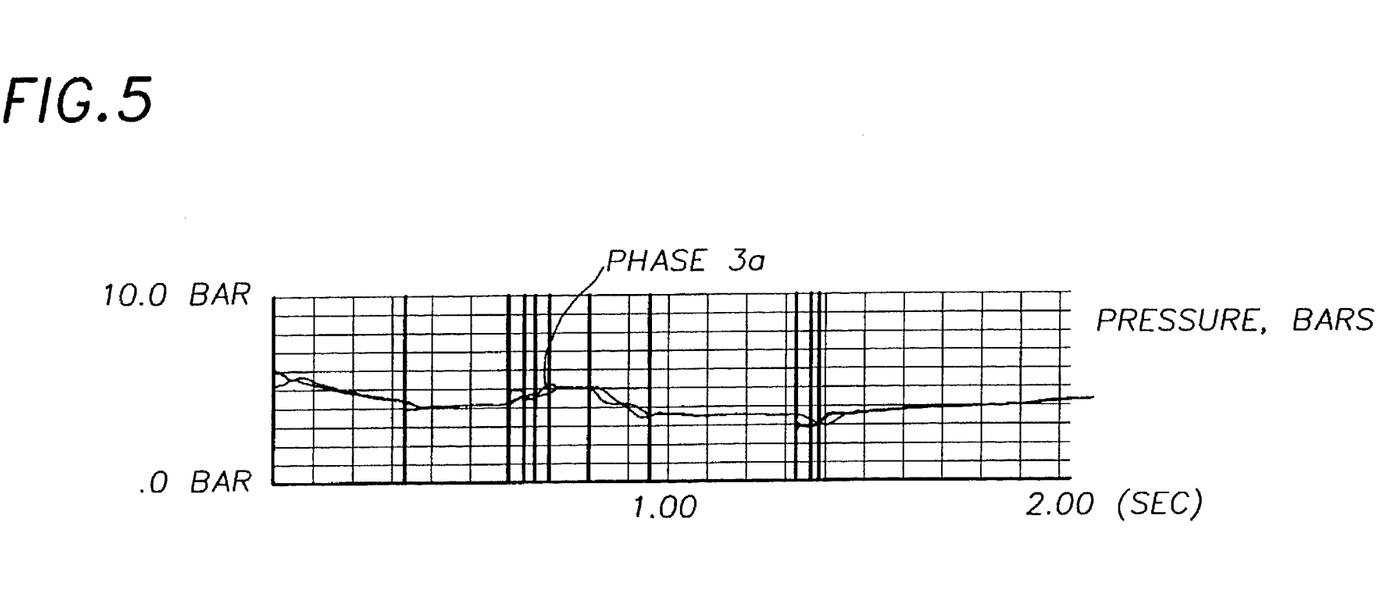
FIG. 5 shows a diagram with elevated positioning pressure.

As can be seen from the "pressure" diagram in FIG. 5, the holder program keeps the positioning pressure in the range of the required final welding pressure throughout the entire positioning movement. For comparison, reference can be made to FIG. 4b, phase 3a, where the positioning pressure has not yet been increased.

Figure 4A:
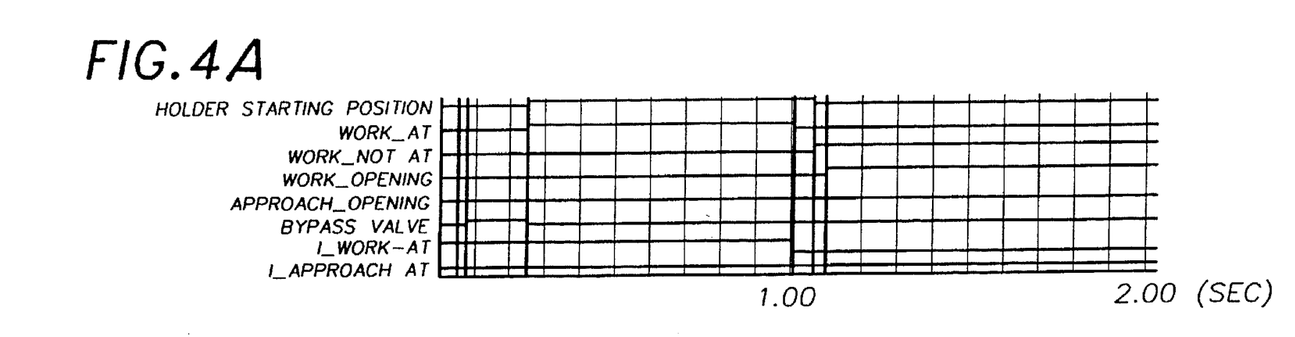
FIG. 4A shows a sequence of signals for controlling the servo controlled rive during transition from the working stroke (phase 2) to the pressure build-up and welding (phase 3)
Figure 4C:
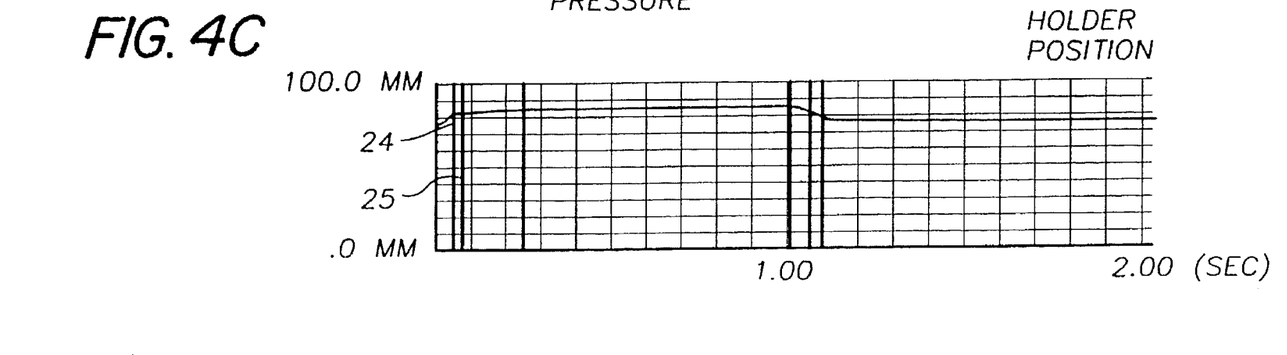
FIG. 4C shows the position of the servo-controlled rive as a function of time (phase 2 to phase)

In the following, the transition from phase 2 (working stroke) to phase 3 (pressure build-up) is explained on the basis of FIGS 4A–4C which show, in order, the sequence of signals sent from computer 5 to the drive of the robot as a function of time (FIG. 4A), the measured pressure in rear chamber 15 of cylinder 2 and the average pressure (FIG. 4B), and the position of connecting rod 9 of cylinder 2 measured by distance pickup 6 (FIG. 4C).

At time t=0, the phase "working stroke-closing" starts after the signals I_APPROACH AT=1 and I_WORK_ AT=1 have been received at the input to computer 5. Servo valve 3 vents its air for 45 milliseconds, and then connecting rod 9 moves up as far as the workpiece but does not actually touch it. Servo valve 4 is driven in the same way as servo valve 3.

The phase "working stroke-closing" ends at the point characterized in all the diagrams by the vertical line 24. Phase 2 then also turns off the rate feedback, and a waiting period of 20 milliseconds is inserted, the duration of which can be preselected by way of the holder program. Simultaneously, connecting rod 9 and thus electrode 11 move slowly onward toward the workpiece to be welded. Meanwhile, it is also possible to begin, if desired, with the venting of forward chamber 16 of cylinder 2 by way of servo valve 4.

With the beginning of the pressure build-up phase marked by vertical line 25, the transition to pressure control by means of the holder program running on computer 5 commences. A software controller for the set/actual comparison of the pressure ensures a rapid pressure increase, which can be seen from the course of the pressure curve in FIG. 4(b) immediately after the start of the pressure build-up phase. Servo valve 4 is open all the way during this phase.

If desired, a bypass valve 20 for servo valve 3 can be actuated during this phase to increase the amount of air in rear chamber 15 and to achieve a further reduction in the closing time.

After 0.212 second, marked in the diagrams by the vertical line 02, a limit, such as approximately 90% of the final welding pressure to be reached, is exceeded. In the present case, this value is 4.98 bars, and it can be programmed by way of the holder program. The corresponding control signals for the welding current control system are set, so that now the welding can be done without the application of any further preliminary pressure. The bypass valve is now closed (a).

Cylinder 21 provided for holder compensation is connected to the compressed air line by way of a pressure controller 22, designed as a servo valve.

In an advantageous embodiment of the invention, the force exerted by cylinder 21 is also actively influenced by the holder program running on computer 5.

What is claimed is:

1. Process for automatic control of an electrode holder, said process comprising providing a pneumatic cylinder having a rear chamber, a forward chamber, and a piston therebetween, said piston driving said electrode holder, providing rear and forward servo valves for controlling air pressure in respective rear and forward chambers, measuring the position of the electrode holder, measuring the pressure in at least one of said chambers, transmitting the measured position and pressure to a data processor which controls movement of the electrode holder by operating the servo valves, moving said electrode holder with an electrode therein toward a workpiece to be welded during an approach stroke, said approach stroke ending at an approach position, moving said electrode holder from said approach position to a working position toward said workpiece, building up pressure in said chambers to a required working pressure during a working stroke, moving said electrode holder so that said electrode contacts the workpiece to be welded with a force which is proportional to said required working pressure, and welding said workpiece during a welding phase.

2. Process as in claim 1 wherein said position of said electrode holder is measured with a resistance pickup.

3. Process as in claim 1 wherein the position of the electrode holder is measured by means comprising an electronic magnifier.

4. Process as in claim 1 wherein said servo valves are 3/3-way servo valves.

5. Process as in claim 1 wherein said data processor is programmed by means of a manual programming device.

6. Process as in claim 1 further comprising changing said pressure during said welding phase.

7. Process as in clam 1 wherein said data processor controls movement of said electrode holder by means of characteristic operating curves of the servo valves.

8. Process as in claim 1 wherein said data processor comprises a circuit board installed on the electrode holder.

9. Process as in claim 1 further comprising providing a pneumatic compensation cylinder acting on said electrode holder, said data process actively influencing the force exerted by the compensation cylinder on the electrode holder.

10. Process as in claim 1 further comprising providing a cut-in damping system.

11. Process as in claim 10 wherein the flow through the servo valves is limited during a cut-in phase.

12. Process as in claim 1 further comprising providing an extreme position damping system acting on the pneumatic cylinder.

13. Process as in claim 12 wherein the flow through the servo valves is decreased continuously as said electrode holder approaches said working position.

14. Process as in claim 13 wherein said flow is decreased according to flow reduction curves which depend on said working position.

15. Process as in claim 1 further comprising measuring the wear on the welding electrode and producing a corresponding electric signal, transmitting said electrical signal to said data processor, and adjusting the required working pressure in response to said signal.

16. Process as in claim 1 wherein said data processor controls current to said electrode during said welding phase.

17. Process as in claim 1 wherein said data processor is a computer operated as part of a network of computers for identical processes.

18. Process as in claim 1 comprising compiling and storing set data for said welding phase in said data processor, said set data including data pertaining to movement of said electrode holder.

19. Process as in claim 1 wherein the force with which the electrode contacts the workpiece is measured by measuring deflection of brackets connected to the electrode holder.

* * * * *